United States Patent
Hartmann et al.

(10) Patent No.: US 7,062,372 B2
(45) Date of Patent: Jun. 13, 2006

(54) METHOD AND ARRANGEMENT FOR CONTROLLING THE DRIVE UNIT OF A VEHICLE

(75) Inventors: Dirk Hartmann, Stuttgart (DE); Martin Froehlich, Linkenheim-Hochstetten (DE); Gholamabas Esteghlal, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 319 days.

(21) Appl. No.: 10/625,662

(22) Filed: Jul. 24, 2003

(65) Prior Publication Data
US 2005/0021219 A1 Jan. 27, 2005

(30) Foreign Application Priority Data
Jul. 24, 2002 (DE) .......................... 102 33 578

(51) Int. Cl.
*F02D 41/02* (2006.01)
*F02D 41/14* (2006.01)

(52) U.S. Cl. ................ 701/110; 123/350; 180/197
(58) Field of Classification Search ................ 701/110, 701/115, 102, 51, 58, 90, 91; 123/350, 325, 123/333; 180/197
See application file for complete search history.

(56) References Cited

U.S. PATENT DOCUMENTS

| | | | | | |
|---|---|---|---|---|---|
| 5,941,925 | A | * | 8/1999 | Hess et al. | 701/91 |
| 6,064,934 | A | * | 5/2000 | Zhang | 701/51 |
| 6,285,946 | B1 | * | 9/2001 | Steinmann | 701/110 |
| 2003/0006076 | A1 | * | 1/2003 | Tamor | 180/65.2 |

* cited by examiner

*Primary Examiner*—Hieu T. Vo
(74) *Attorney, Agent, or Firm*—Walter Ottesen

(57) ABSTRACT

A method and an arrangement for controlling the drive unit of a vehicle make possible the jolt-free enablement of a rapid actuating path (5) for the conversion of a desired value for an output quantity of the drive unit. The desired value for the output quantity of the drive unit is pregiven. Depending upon the operating state of the drive unit, an actual value for the output quantity is caused to track the desired value via a slow actuating path (1) or the rapid actuating path (5). With a transition from the slow actuating path (1) to the rapid actuating path (5), the desired value, starting from the wanted value, is first set equal to the actual value and thereafter is limited in its change and is again brought back to the wanted value.

11 Claims, 3 Drawing Sheets

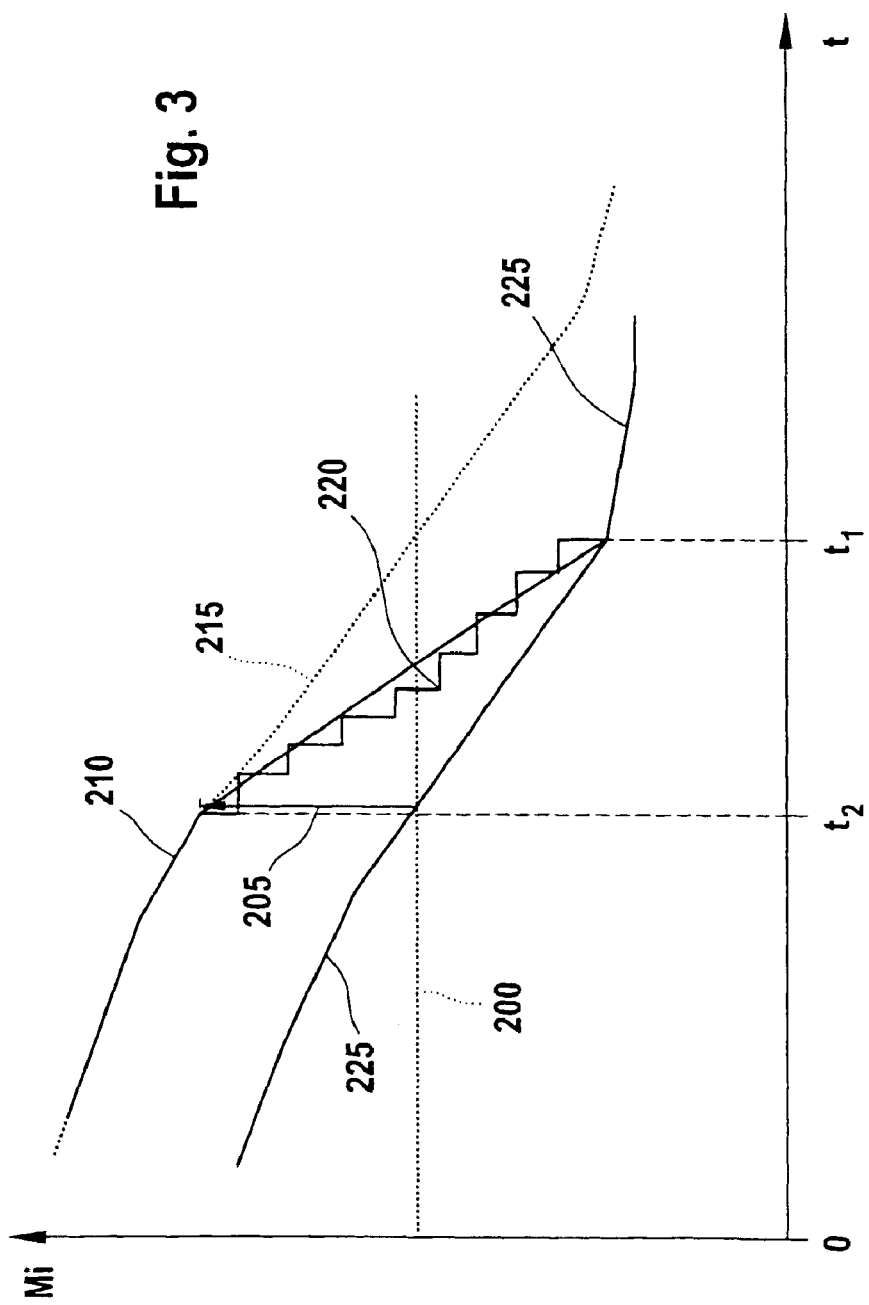

METHOD AND ARRANGEMENT FOR CONTROLLING THE DRIVE UNIT OF A VEHICLE

BACKGROUND OF THE INVENTION

It is known to input a desired value for an output quantity of the drive unit. The output quantity can, for example, be a wheel output torque or an engine output torque. Furthermore, it is known to cause an actual value to track the desired value for such an output torque. Various actuating paths are provided which are used in dependence upon operating state of the drive unit so as to cause actual value to track the desired torque. In a part-load or full-load state of the drive unit, the actual value for the output torque is, for example, caused to track a driver command torque as desired value via a slow actuating path. The slow actuating path is, for example, the charging path with an air charge of the cylinder of the drive unit as actuating quantity. If the operating state of the drive unit is, for example, characterized by the transition from a homogeneous operation into a stratified operation in gasoline direct injection, then the realization of the desired value for the output torque takes place via a rapid actuating path. The rapid actuating path is, as a rule, a crankshaft angle synchronous path, for example, an ignition angle path with the ignition angle as actuating quantity or a fuel path with the injection quantity and/or the injection time as actuating quantity.

SUMMARY OF THE INVENTION

Compared to the above, the method and arrangement of the invention for controlling the drive unit of a vehicle afford the advantage that, for a transition from the slow actuating path into the rapid actuating path, the desired value starting from a wanted value is first set equal to the actual value and that the desired value, limited in its change, is again guided back to the wanted value. In this way, it is prevented that an abrupt change of the actual value in the direction toward the desired value occurs with the transition from the slow actuating path to the rapid actuating path. This abrupt change of the actual value would lead to a jolt of the vehicle and the driver would realize the same as unpleasant. Accordingly, the driving comfort is increased and a noticeable jolt is prevented.

A simple possibility for limiting the change of the desired value lies in using a filter, especially a lowpass. When the time constant of the filter is selected in dependence upon the operating point of the drive unit, then, in an advantageous manner, the change limitation of the desired value can be adapted to the operating point of the drive unit. Depending upon the operating point of the drive unit, it can be provided to return the desired value more rapidly or more slowly to the desired value starting from the actual value and to correspondingly vary the change limiting.

A further advantage is that the change of the desired value is limited by a ramp function. In this way, the change limiting is realized more simply and with less complexity.

It is especially advantageous to detect the transition from the slow actuating path to the rapid actuating path when: there is a switchover from a homogeneous operation into a stratified operation with gasoline direct injection; a clutch is actuated; an idle state is adjusted; or, a minimum permissible charge is reached. In this way, and for the operating states described, a jump of the actual value for the output quantity of the drive unit is prevented and therewith a noticeable jolt of the vehicle.

BRIEF DESCRIPTION OF THE DRAWINGS

The invention will now be described with reference to the drawings wherein:

FIG. 3 is a diagram showing the output torque plotted as a function of time explaining the operation of the method of the invention.

DESCRIPTION OF THE PREFERRED EMBODIMENTS OF THE INVENTION

Figure 1:
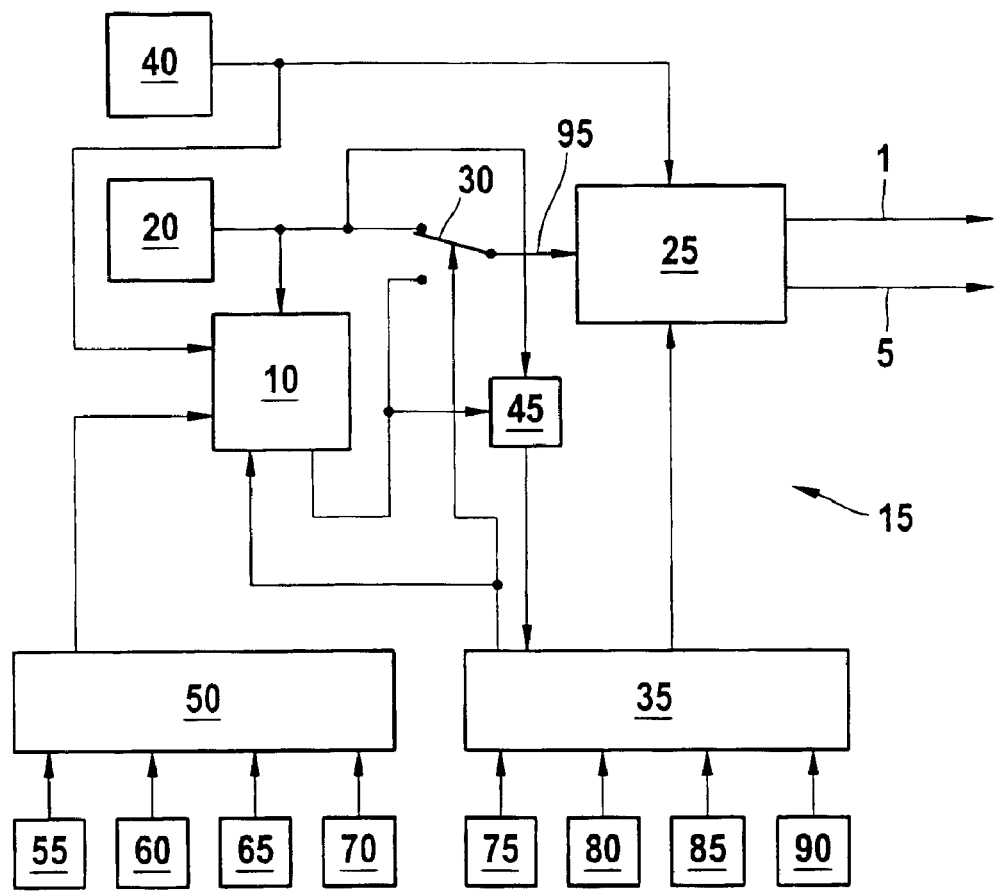
FIG. 1 is a block circuit diagram of an arrangement according to the invention.

In FIG. 1, reference numeral 15 identifies an arrangement for controlling the drive unit of a vehicle as it can, for example, be implemented in an engine control of the vehicle utilizing hardware and/or software. In this example, the drive unit of the vehicle is a spark-ignition engine having gasoline direct injection. However, the drive unit can be based on any desired drive concept for realizing the invention, for example, also spark-ignition engines having intake manifold injection or diesel engines. The arrangement 15 includes means 25 for the tracking of an actual value for an output quantity of the drive unit to a desired value and can be configured as a controller including, for example, a P component, an I component and/or a D component. The output quantity of the drive unit can, for example, be a wheel output torque or an engine output torque or a so-called indicated engine torque $M_i$. Alternatively, the output quantity can be a quantity derived from such a torque, for example, the output quantity can be an output power. In the following, it will be assumed by way of example that the output quantity is the indicated engine torque $M_i$. The desired value for the indicated torque $M_i$ is, in the following, also referred to as desired torque and the actual value for the indicated torque $M_i$ is, in the following, also identified as the actual torque. The desired torque is supplied to the means 25 via a switch 30 and the actual torque is supplied to the means 25 by the means 40 for detecting the actual torque. The detection of the actual torque is not the subject matter of this invention and takes place in a manner known per se, for example, in dependence upon the engine rpm and the engine load. The desired torque can be supplied via the switch 30 to the controller 25 either by means 20 for inputting the desired torque or by means 10 for limiting a change of the desired torque. The means 20 can, for example, be a torque coordinator which coordinates the torque requests of various vehicle functions and/or of engine functions and outputs a resulting desired torque. A vehicle function is, for example, realized by an accelerator pedal with which the driver can input a driver command torque by the actuation thereof. Additional vehicle functions, which input torque requests, can, for example, be a drive slip control, an anti-blocking system, an electronic stability program or the like. Engine functions, which generate torque requests, can, for example, be an idle control or a surge damping control.

In a first realization form, it is assumed, by way of example, that the means 10 for limiting the change of the desired torque is a filter, for example, a lowpass. As an input quantity, which is to be filtered, the desired torque, which is outputted by the coordinator 20, is supplied to the lowpass 10. Furthermore, means 50 are provided for computing a filter time constant which, in the following, is also referred to as a computation unit and computes the filter time constant from at least one input quantity and supplies the same to the lowpass 10. In the computation unit 50, the filter time constant is computed in dependence upon the instantaneous operating point of the drive unit. In this example, the drive unit includes an internal combustion engine. The operating point of the drive unit is dependent upon the following: the engine rpm of the internal combustion engine; the intake manifold time constant and therefore the dynamic of the intake manifold of the engine; the engine temperature; the engine torque adjusted via a cylinder charge of the engine; and, additional quantities. The following in FIG. 1 are exemplary: an rpm sensor 55 for detecting the engine rpm; means 60 for determining the intake manifold time constant; a temperature sensor 65 for detecting the engine temperature; and, means 70 for detecting the engine torque, which is realized by the cylinder charge. These means detect the above-mentioned quantities in a manner known per se and supply the same to the computation unit 50. From these supplied quantities, the computation unit 50 determines the filter time constant, for example, via a characteristic field applied in a test operation of the vehicle. For determining the filter time constant, more quantities can be used which determine still better the operating point of the drive unit or fewer quantities can be used than described in accordance with FIG. 1 depending upon whether the filter time constant is to be adapted strongly or less strongly to the operating point of the drive unit. Alternatively, it can be provided to input the filter constant independently of the operating point of the drive unit and to store the same in the lowpass 10.

The arrangement 15 further includes a control 35 which drives the switch 30 with a drive signal and initializes also the lowpass 10 with this drive signal. If the drive signal is set, then the switch 30 is caused to connect the output of the lowpass 10 to the desired value input of the controller 25 which is identified by reference numeral 95. Furthermore, the lowpass 10 is initialized by setting the drive signal. If the drive signal is reset, then the switch 30 is so driven that it connects the output of the coordinator 20 to the desired value input 95. Furthermore, the lowpass 10 is reset by the reset drive signal. With the initialization of the lowpass 10 by the setting of the drive signal by the control 35, the output of the lowpass 10 is first set to the actual torque supplied by the means 40 and this actual torque is likewise supplied to the lowpass 10 from the output of the means 40. In this way, after initialization of the lowpass 10, the output of the lowpass 10 transfers into the desired torque supplied by the coordinator 20 starting from the actual torque with the time constant supplied by the computer unit 50. In this way, a limiting of the change of the desired torque is carried out when there is a connection of the output of the lowpass 10 with the desired value input 95 via the switch 30. The change limiting is dependent upon the filter time constant and therefore on the operating point of the drive unit. For limiting the change of the desired torque, a ramp function can be used in lieu of the filter 10. The ramp function can be initialized by the control 35 in the same way as the described lowpass 10. At the same time, the switch 30 is driven to connect the output of the ramp function to the desired value input 95. With the initialization, the output of the ramp function is set equal to the instantaneous torque in the same manner and is reduced in accordance with the trace of the ramp function to the desired torque supplied by the coordinator 20 so that the limiting of the change of the desired torque results from the trace of the ramp function. Depending upon the operating point of the drive unit, various traces for the ramp function are pregiven by the computing unit 50. This can take place, for example, in that various ramp functions are pregiven in the computer unit 50 by means of a characteristic field applied during a test operation of the vehicle in dependence upon the following: the engine rpm; the intake manifold time constant; the engine temperature; and, the engine torque which is realized via the cylinder charge. For the initialization of the ramp function, the pregiven course of the ramp function is used which is fixed for the instantaneous operating point of the drive unit in the computing unit 50.

The setting of the drive signal by the control 35 is dependent upon the operating state of the drive unit. Means 75 are, for example, provided which detect a switchover from a homogeneous operation into a stratified operation in gasoline-direct injection spark-ignition engines. The detection can, for example, take place in that the means 75 checks whether the indicated engine torque $M_i$ has dropped below a pregiven threshold value which marks the limit between the homogeneous operation and the stratified operation. The means 75 are therefore, for example, configured as a comparison device which compares the indicated engine torque $M_i$ to the pregiven threshold value. Furthermore, a clutch sensor 80 can be provided which detects a state of a clutch of the drive unit in a manner known per se. Furthermore, an idle contact 85 can be provided which is closed with the start of the idle state. In addition, means 90 are provided which compare a desired cylinder charge to a minimum permissible charge and generate a corresponding output signal in dependence upon the comparison. The means 90 are configured likewise as a comparator, for example.

The means 75 and 90 as well as the clutch sensor 80 and the idle contact 85 are connected to the control 35 in order to impart information as to the instantaneous operating state of the drive unit to the control 35. The control 35 initiates a setting of the drive signal if one of the following operating states of the drive unit is detected:

(a) a switchover from homogeneous operation into stratified operation is detected by the means 75;

(b) the clutch sensor 80 has detected a depressed clutch pedal or an opening of the clutch or a released clutch pedal or a closing of the clutch;

(c) the idle contact 85 was closed so that a starting idle state of the engine was detected; and, (d) the desired cylinder charge reaches the minimum permissible charge; the desired torque is less than the actual torque.

The comparison between desired torque and actual torque can likewise take place via the means 90 which can be connected for this purpose to the means 40 and to the coordinator 20. In addition to the detectable operating states of the drive unit shown, additional operating states can be detected which trigger a setting of the drive signal via the control 35.

The controller 25 can realize the conversion of the desired torque, which is pregiven via the desired value input 95, via a slow actuating path 1 and/or a rapid actuating path 5. The slow actuating path 1 can, for example, be a charge path wherein the pregiven desired torque is realized by means of the cylinder charge as an actuating quantity. The rapid actuating path 5 can be a crankshaft angle synchronous path. The crankshaft angle synchronous path can, for example, be realized via an ignition angle path and/or a fuel path. With the ignition angle path, the realization of the pregiven desired torque takes place via the adjustment of the ignition angle and, with the fuel path, the realization of the pregiven desired angle takes place via the injection quantity and/or the injection time as an actuating quantity. The pregiven desired torque can be realized via only one of the two actuating paths (1, 5) or with simultaneous use of both actuating paths (1, 5). With the setting of the drive signal because of the detection of the corresponding operating state of the drive unit, the controller 25 is driven by the control 35 in such a manner that it enables the rapid actuating path 5, for example, via an ignition angle enablement. This means that the actual torque can be rapidly matched to the desired torque which leads to a noticeable jolt of the vehicle and therefore to a reduction of comfort. This can be avoided in accordance with the invention.

For this purpose, the enablement of the crankshaft angle synchronous path 5 is retained with the setting of the drive signal; however, the switch 30 is driven as described for connecting the output of filter 10 to the desired value input 95. In this example, the lowpass filter 10 is viewed as representative for the limiting of the change of the desired torque. In this way, with the enablement of the crankshaft angle synchronous actuating path 5, the desired torque is set equal to the instantaneous actual torque at the desired value input 95 and, with the filter time constant, is caused to approach the desired torque outputted by the coordinator 20 via lowpass filtering. A comparator 45 is provided to which the output of the lowpass 10 and the output of the coordinator 20 are connected. The comparator compares the desired torque, which is pregiven by the coordinator 20, to the output of the lowpass. If the spacing between the desired torque, which is pregiven by the coordinator 20, and the output of the lowpass 10 lies below a pregiven threshold, then the comparator 45 causes the control 35 to reset the drive signal so that the switch 30 is driven to connect the output of the coordinator 20 to the desired value input 95 and the lowpass 10 is reset. Furthermore, with the resetting of the drive signal, the controller 25 is also driven by the control 35 in such a manner that the enablement of the crankshaft angle synchronous actuating path 5 is ended and a realization of the desired torque, which is pregiven at the desired value input 95, takes place only via the charge path 1. As an alternative, it can be provided that the drive signal of the control 35 is used to also enable or to block the crankshaft angle synchronous actuating path 5. With a setting of the drive signal, the crankshaft angle synchronous path 5 is enabled and, with a resetting of the drive signal, the crankshaft angle synchronous path 5 is again blocked.

Figure 2:
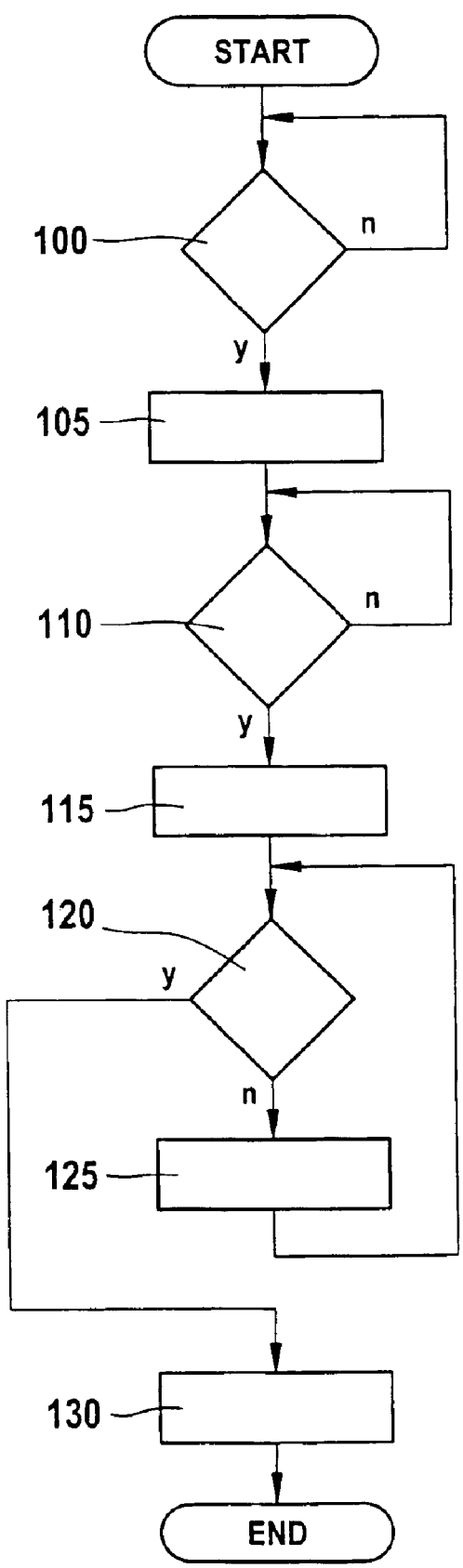
FIG. 2 is a flowchart for explaining the method of the invention.

In FIG. 2, the sequence of the method of the invention is explained in greater detail by way of example with respect to a flowchart.

After the start of the program, the drive signal is first reset and the output of the coordinator 20 is connected via the switch 30 to the desired value input 95 of the controller 25. Furthermore, the actual torque of the drive unit, which is determined by the means 40, is caused by the controller 25 to track the desired torque pregiven at the desired value input 95 exclusively via the charge path 1. At program point 100, the control 35 checks whether one of the above-mentioned operating states is present, that is, whether there: is a switchover from homogeneous operation into stratified operation; the clutch is open or closed; the idle contact is closed; or, the desired cylinder charge reaches the minimum permissible cylinder charge and simultaneously the desired torque is less than the actual torque. If one of the above conditions is satisfied, then the program branches to program point 105; otherwise, the program branches back to program point 100.

At program point 105, the drive signal is set by the control 35 and the lowpass 10 is initialized thereby and the switch 30 is switched over to connect the output of the lowpass 10 to the desired value input 95 and the controller 25 is caused to enable the crankshaft angle synchronous actuating path 5 for realizing the desired torque pregiven at the desired value input 95. The realization of the desired torque, which is pregiven at desired value input 95 (in this case, of the output of the lowpass 10), is achieved in this case via the charging path 1 as well as via the crankshaft angle synchronous actuating path 5. Thereafter, the program branches to program point 110.

At program point 110, the control 35 checks whether information is present from the comparator 45 that the spacing between the desired torque, which is outputted by the coordinator 20, and the output of the lowpass 10 drops below the pregiven threshold. If this is the case, then the program branches to program point 115; otherwise, the program branches back to program point 110.

At program point 115, the control signal is reset by the control 35. In this way, the lowpass 10 is reset and the switch 30 is switched over to connect the output of the coordinator 20 to the desired value input 95 of the controller 25 and the crankshaft angle synchronous actuating path 5 is blocked. The blockage of the crankshaft angle synchronous actuating path 5 with the resetting of the drive signal is, however, not absolutely required and can also be prevented in dependence upon the operating state of the drive unit so that the crankshaft angle synchronous actuating path 5 can also remain enabled after resetting of the drive signal. A blockage of the crankshaft angle synchronous actuating path 5 can then likewise take place in dependence upon the operating state of the drive unit by control 35. In this case, the separate drive of the controller 25 on the one hand and the lowpass 10 and the switch 30 by the control 35 on the other hand, as shown in FIG. 1, is purposeful. There is a branching to program point 120 after program point 115.

In the following, it will be assumed by way of example that, according to FIG. 1, the controller 25 on the one hand, and the lowpass 10 and the switch 30 on the other hand are driven separately. Here, it is assumed that, with the reset of the drive signal, the crankshaft angle synchronous actuating path 5 is enabled as before. At program point 120, the control 35 checks whether one of the mentioned operating states is ended. These operating states are: the switchover of the homogeneous operation into stratified operation; the opening or closing of the clutch; the closing of the idle contact; or, the reaching of the minimum permissible charge value by the desired cylinder charge for a desired torque which is less than the actual torque. If this is the case, then the program branches to program point 130; otherwise, the program branches to program point 125.

At program point 125, the enablement of the crankshaft angle synchronous actuating path 5 is maintained and, thereafter, there is a branching back to program point 120.

At program point 130, the crankshaft angle synchronous actuating path 5 is again blocked by the control 35 via the controller 25. The realization of the desired torque, which is pregiven at the desired value input 95, is, in turn, realized only via the charging path 1. Thereafter, there is a movement out of the program.

In FIG. 3, the operation of the method of the invention is made clear based on an exemplary trace of the indicated engine torque Mi as a function of time (t). In FIG. 3, reference numeral 200 characterizes a pregiven threshold value for the indicated engine torque $M_i$. Furthermore, reference numeral 225 identifies a trace for the wanted desired torque pregiven by the coordinator 20. In FIG. 3, reference numeral 210 characterizes a trace of the actual torque, which is determined by the means 40, which trace assumes greater values for time points less than a first time point $t_1$ than the trace 225 of the desired torque wanted by the coordinator 20. Up to a second time point $t_2$, which is less than the first time point $t_1$, the drive signal is reset and the switch 30 connects the output of the coordinator 20 to the desired value input 95. Furthermore, the desired torque, which is wanted at the desired value input 95 by the coordinator 20 is realized by controller 25 up to the second time pont $t_2$ only via the charging path 1. At the second time point $t_2$, the trace 225 of the desired torque, which is wanted by the coordinator 20, intersects the pregiven threshold value 200 and drops therebelow for time points greater than the second time point $t_2$. Dropping below the pregiven threshold value 200 is interpreted by the control 35 as a switchover from the homogeneous operation into the stratified operation and thereupon the drive signal is set shortly after the second time point $t_2$. In this way, the switch 30 is switched over to connect the output of the lowpass 10 to the desired value input 95 when the drive signal is set and therefore the output of the lowpass 10 is connected to the desired value input 95. In this way, the desired torque, which is present at the desired value input 95, is raised to the actual torque according to trace 210 starting from the desired torque according to trace 225 which is wanted by the coordinator 20. The arrow identified by reference numeral 205 makes clear this raising. Accordingly, with the setting of the drive signal, the desired torque at the desired value input 95 of the controller 25 is first set equal to the actual torque and thereafter, because of the lowpass filtering with the filter time constant up to the first time point $t_1$, is reduced again to the trace 225 of the desired torque wanted by the coordinator 20. This reduction can be realized alternatively via a ramp function as described.

A ramp-shaped limiting of the change of the desired torque, which is present at desired value 95, up to reaching the trace 225 of the desired torque wanted by the coordinator 20 is shown in FIG. 3. The desired torque, which is wanted by the coordinator 20, is again reached at the first time point $t_1$. Depending upon the pregiven threshold in the comparator 45, the drive signal is again reset by the control 35 at the first time point $t_1$ at the latest so that the switch 30 is again connected to the output of the coordinator 20 and, thereafter, the desired torque, which is wanted by the coordinator 20, is again present at the desired value input 95. The ramp-shaped trace of the desired torque, which is present at desired value input 95, is shown in FIG. 3 from the setting of the drive signal shortly after the second time point $t_2$ up to the first time point $t_1$ and this trace is identified by reference numeral 220. This ramp-shaped trace can be based on a trace of the ramp function which is pregiven by the computing unit 50 for the instantaneous operating point of the drive unit. This ramp-shaped trace of the desired torque of FIG. 3 is, for the sake of simplicity, likewise characterized as a filtering so that, for the example of FIG. 3, as before, the filter 10 can be viewed for limiting the change of the desired value.

The enablement of the crankshaft angle synchronous actuating path 5 shortly after the second time point $t_2$ takes place with the setting of the drive signal. For this reason, the actual torque 210 very rapidly follows the ramp-shaped trace 220 of the desired torque in order to likewise reach the trace 225 of the desired torque, which is wanted by the coordinator 20, at the first time point $t_1$. In FIG. 3, the trace of the actual torque is furthermore identified by reference numeral 215 and this trace would occur from the second time point $t_2$ if, as before, only the charging path 1 were enabled. Here, it is noted that the tracking of the actual torque would take place only via the charging path 1 much slower than if the crankshaft angle synchronous actuating path 5 were to be enabled. If, at the second time point $t_2$ or shortly thereafter, the switch 30 would not be switched over to connect the output of the lowpass 10 to the desired value input 95 but rather, as before, would connect the output of the coordinator 20 to the desired value input 95, then the actual torque from the second time point $t_2$ and following would abruptly and quasi jump-like jump to the trace 225 of the desired torque, which is wanted by the coordinator 20, because of the enablement of the crankshaft angle synchronous actuating path 5. This would have caused a noticeable jolt and this is avoided by the method and the arrangement according to the invention.

According to the embodiment of FIG. 1, it can be provided that the trace 225 of the wanted desired torque according to FIG. 3 can be realized up to the second time point $t_2$ exclusively via the charging path 1 and, as soon as the switchover from the homogeneous operation into the stratified operation is detected, the wanted desired torque would be realized only via the crankshaft angle synchronous actuating path 5. With the reaching of the wanted desired torque by the actual torque at the first time point $t_1$, it can be provided, for time points greater than the first time point $t_1$, that the actual torque again tracks the wanted desired torque exclusively via the charging path 1. In this case, the coordinator 20, as described, supplies the wanted desired torque independently of whether it was realized via the charging path 1 or the crankshaft angle synchronous actuating path 5 and the decision as to via which of the two actuating paths (1, 5) the desired torque, which is present at the desired value input 95, should be realized takes place, in the manner described, by driving the controller 25 via the control 35.

If the filter 10 is configured as a lowpass, then it can, for example, be a lowpass of the first or second or higher order. If the filter time constant, as described, is selected or computed in dependence upon the operating point of the drive unit, then the limiting of the change of the desired torque can be flexibly configured as described.

The charging path 1 is the slower actuating path because it is determined by the dynamics of the intake manifold and therefore by the intake manifold time constant. In spark-ignition engines, the crankshaft angle synchronous actuating path 5 can be selected as the ignition angle path and/or as the fuel path. In diesel engines, the crankshaft angle synchronous actuating path 5 is the fuel path.

It can further be provided that the coordinator 20 inputs a desired torque, which is to be realized via the charging path 1 as well as via the crankshaft angle synchronous actuating path 5. Here, only the desired torque, which is to be realized via the crankshaft angle synchronous actuating path 5 should be viewed. In this case, only the desired torque, which is to be realized via the crankshaft angle synchronous actuating path 5, lies at the desired value input 95 of the controller 25 and the controller 25 causes the actual torque to track this desired torque only via the crankshaft angle synchronous actuating path 5 insofar as this is enabled. The enablement and the blocking of the crankshaft angle synchronous actuating path 5 takes place in a manner described above. For the realization of the desired torque, which is provided for the charging path 1, an individual controller can, for example, be provided which is not shown in FIG. 1.

It is understood that the foregoing description is that of the preferred embodiments of the invention and that various changes and modifications may be made thereto without departing from the spirit and scope of the invention as defined in the appended claims.

What is claimed is:

1. An arrangement for controlling the drive unit of a vehicle, the arrangement comprising:

means for presetting a desired value for an output quantity of said drive unit;

means for causing an actual value of said output quantity to track said desired value in dependence upon the operating state of said drive unit via a slow actuating path or a rapid actuating path;

means for setting said desired value first equal to said actual value starting from a wanted value when there is a transition from said slow actuating path to said rapid actuating path; and, means for thereafter again returning said desired value to said wanted value with its change limited.

2. A method for controlling the drive unit of a vehicle, the method comprising the steps of:

presetting a desired value for an output quantity of said drive unit;

causing an actual value of said output quantity to track said desired value in dependence upon the operating state of said drive unit via a slow actuating path or a rapid actuating path;

when there is a transition from said slow actuating path to said rapid actuating path, setting said desired value first equal to said actual value starting from a wanted value; and, thereafter, again returning said desired value to said wanted value with its change limited.

3. The method of claim 2, comprising the further step of limiting the change of said desired value with a filter.

4. The method of claim 3, wherein said filter is a lowpass filter.

5. The method of claim 2, comprising the further step of selecting a time constant of said filter in dependence upon an operating point of said drive unit.

6. The method of claim 2, comprising the further step of limiting the change of said desired value via a ramp function.

7. The method of claim 2, comprising the further step of detecting a transition from said slow actuating path to said rapid actuating path when one of the following conditions is satisfied: a switchover from a homogeneous operation into a stratified operation; a clutch is actuated; an idle state is set; or, a minimal permissible charge is reached.

8. The method of claim 2, comprising the further step of selecting a torque as said output quantity.

9. The method of claim 2, comprising the further step of selecting a charging path as said slower actuating path.

10. The method of claim 2, comprising the further step of selecting a crankshaft angle synchronous path or a fuel path as said rapid actuating path.

11. The method of claim 10, wherein said crankshaft angle synchronous path is an ignition angle path.

* * * * *

UNITED STATES PATENT AND TRADEMARK OFFICE
CERTIFICATE OF CORRECTION

PATENT NO. : 7,062,372 B2  
APPLICATION NO. : 10/625662  
DATED : June 13, 2006  
INVENTOR(S) : Dirk Hartmann, Martin Froehlich and Gholamabas Esteghlal It is certified that error appears in the above-identified patent and that said Letters Patent is hereby corrected as shown below:

In column 10:
Line 7: delete "claim 2," and insert -- claim 3, -- therefor.

Signed and Sealed this

Ninth Day of January, 2007

JON W. DUDAS  
*Director of the United States Patent and Trademark Office*